US012656793B2

(12) United States Patent
Cantrell et al.

(10) Patent No.: US 12,656,793 B2
(45) Date of Patent: Jun. 16, 2026

(54) PROACTIVE THERMAL MANAGEMENT SYSTEM

(71) Applicant: EATON INTELLIGENT POWER LIMITED, Dublin (IE)

(72) Inventors: Christopher Thomas Cantrell, Jackson, MI (US); Manoj Prakash Gokhale, Magarpatta City (IN); Rishabh Kumar Jain, Mundhwa (IN); Parag Ashok Gumaste, Pune (IN); Pranavamoorthy Balasubramanian, Chennai (IN)

(73) Assignee: Eaton Intelligent Power Limited, Dublin (IE)

( * ) Notice: Subject to any disclaimer, the term of this patent is extended or adjusted under 35 U.S.C. 154(b) by 206 days.

(21) Appl. No.: 17/898,965

(22) Filed: Aug. 30, 2022

(65) Prior Publication Data

US 2023/0067744 A1     Mar. 2, 2023

(30) Foreign Application Priority Data

Aug. 31, 2021    (IN) .............................. 202111039315

(51) Int. Cl.
G05D 23/19 (2006.01)
B60L 58/24 (2019.01)
(Continued)

(52) U.S. Cl.
CPC .......... G05D 23/1919 (2013.01); B60L 58/24 (2019.02); B64D 27/34 (2024.01);
(Continued)

(58) Field of Classification Search
CPC ......... B64D 33/08; B64D 27/24; B60L 58/24; B60L 2200/10; B60L 2240/425;
(Continued)

(56) References Cited

U.S. PATENT DOCUMENTS 8,448,460 B2    5/2013   Dogariu et al.
9,669,936 B1    6/2017   Fiterman et al.
(Continued)

FOREIGN PATENT DOCUMENTS

CN         111591108 A      8/2020
CN         112888584 A      6/2021
(Continued)

OTHER PUBLICATIONS

ENglish translation of Kim et al. (KR 20190048379) (Year: 2019).*
Search Report for European Patent Application No. 22192958.1 (Jan. 9, 2023).

*Primary Examiner* — Kyle J Kingsland
(74) *Attorney, Agent, or Firm* — Merchant & Gould P.C.

(57) ABSTRACT

A thermal management system proactively provides cooling to powered components and/or the battery of an aircraft based on expected temperature rises of the components. The thermal management system may monitor maneuver commands input by a pilot and/or may monitor a flight plan including maneuver commands and associated trigger events to determine when to take proactive steps. The thermal management system may adjust a coolant flow rate and/or may adjust a refrigerant flow rate to increase or decrease the level of cooling provided to various components.

15 Claims, 6 Drawing Sheets

(51) Int. Cl.

| | |
|---|---|
| *B64D 27/34* | (2024.01) |
| *B64D 27/357* | (2024.01) |
| *B64D 33/08* | (2006.01) |
| *G07C 5/02* | (2006.01) |
| *H01M 10/613* | (2014.01) |
| *H01M 10/625* | (2014.01) |
| *H01M 10/633* | (2014.01) |
| *H01M 10/6568* | (2014.01) |

(52) U.S. Cl.

CPC .......... *B64D 27/357* (2024.01); *B64D 33/08* (2013.01); *G07C 5/02* (2013.01); *H01M 10/613* (2015.04); *H01M 10/625* (2015.04); *H01M 10/633* (2015.04); *H01M 10/6568* (2015.04); *B60L 2200/10* (2013.01); *B60L 2240/425* (2013.01); *B60L 2240/545* (2013.01); *H01M 2220/20* (2013.01)

(58) Field of Classification Search

CPC .. B60L 2240/545; G07C 5/02; H01M 10/613; H01M 10/625; H01M 10/633; H01M 10/6568; H01M 2220/20; G05D 23/1919

See application file for complete search history.

(56) References Cited

U.S. PATENT DOCUMENTS

| | | | |
|---|---|---|---|
| 9,780,422 | B2 | 10/2017 | Dunn et al. |
| 10,076,944 | B2 | 9/2018 | Jalilevand et al. |
| 10,513,982 | B2 | 12/2019 | Dailey et al. |
| 10,644,367 | B2 | 5/2020 | Jalilevand et al. |
| 10,710,433 | B2 | 7/2020 | Graaf et al. |
| 10,794,617 | B2 | 10/2020 | Moxon |
| 10,960,785 | B2 | 3/2021 | Villanueva et al. |
| 11,827,370 | B1 | 11/2023 | Freer |
| 2012/0085512 | A1 | 4/2012 | Graaf et al. |
| 2018/0170569 | A1 | 6/2018 | Brodeur |
| 2019/0100319 | A1 | 4/2019 | Mackin |
| 2019/0128570 | A1 | 5/2019 | Moxon |
| 2019/0286079 | A1* | 9/2019 | Zang ..................... B60L 50/50 |
| 2019/0308604 | A1* | 10/2019 | Kono ..................... B60K 1/02 |
| 2019/0356030 | A1 | 11/2019 | Venkatasubramanian et al. |
| 2020/0047908 | A1 | 2/2020 | Filipenko et al. |
| 2020/0298663 | A1 | 9/2020 | Allgaeuer et al. |
| 2020/0339010 | A1 | 10/2020 | Villanueva et al. |
| 2020/0343601 | A1* | 10/2020 | Carlson .................. B60L 58/26 |
| 2020/0355119 | A1 | 11/2020 | Ribarov |
| 2020/0361304 | A1 | 11/2020 | Takamatsu |
| 2020/0391876 | A1 | 12/2020 | Morrison |
| 2021/0053689 | A1 | 2/2021 | Lynn et al. |
| 2021/0061477 | A1 | 3/2021 | Heironimus |
| 2021/0138868 | A1* | 5/2021 | Bruneau .......... H01M 10/6552 |
| 2021/0156296 | A1 | 5/2021 | Xi et al. |
| 2022/0271363 | A1* | 8/2022 | Burkell .................. B60L 53/60 |
| 2022/0306305 | A1 | 9/2022 | Cottrell et al. |
| 2023/0070111 | A1 | 3/2023 | Jain et al. |
| 2023/0079696 | A1 | 3/2023 | Makhe et al. |
| 2023/0202256 | A1 | 6/2023 | Lonberger et al. |
| 2023/0406519 | A1 | 12/2023 | Freer |

FOREIGN PATENT DOCUMENTS

| | | | | |
|---|---|---|---|---|
| CN | 213383775 U | | 6/2021 | |
| DE | 10 2008 062 176 A1 | | 6/2010 | |
| DE | 10 2018 113 687 A1 | | 12/2019 | |
| EP | 3480114 A1 | | 5/2019 | |
| KR | 10-2016-0046262 A | | 4/2016 | |
| KR | 10-2019-0048379 A | | 5/2019 | |
| KR | 20190048379 A | * | 5/2019 | ............... F01P 5/10 |
| WO | 2018/154782 A1 | | 8/2018 | |
| WO | 2021/095395 A1 | | 5/2021 | |
| WO | 2022/184325 A1 | | 8/2022 | |

* cited by examiner

Figure 6:
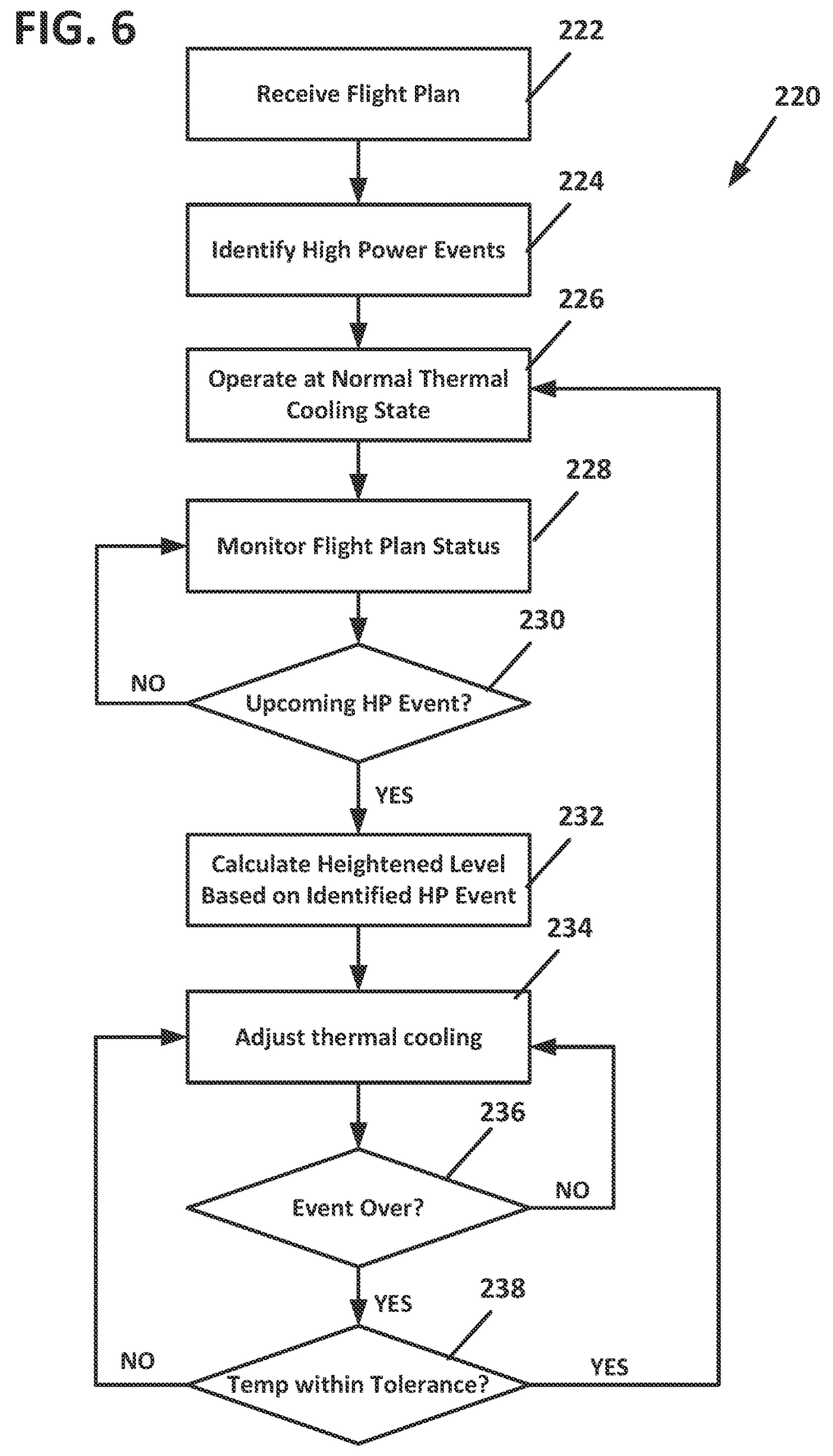

```
              ┌─────────────────────────┐  222
              │    Receive Flight Plan   │
              └─────────────────────────┘
                          │
                          ▼
              ┌─────────────────────────┐  224
              │ Identify High Power Events│
              └─────────────────────────┘
                          │                         220
                          ▼
              ┌─────────────────────────┐  226
              │  Operate at Normal Thermal│ ◄──────────┐
              │      Cooling State        │            │
              └─────────────────────────┘            │
                          │                           │
                          ▼                           │
              ┌─────────────────────────┐  228        │
         ┌──►│  Monitor Flight Plan Status│           │
         │   └─────────────────────────┘            │
         │                │                           │
         │                ▼            230            │
         │   NO  ◄───◇ Upcoming HP Event? ◇            │
         └──────                                       │
                          │ YES                        │
                          ▼                            │
              ┌─────────────────────────┐  232         │
              │  Calculate Heightened Level│            │
              │  Based on Identified HP Event│          │
              └─────────────────────────┘            │
                          │            234             │
                          ▼                            │
         ┌──►┌─────────────────────────┐             │
         │   │   Adjust thermal cooling  │ ◄──────┐    │
         │   └─────────────────────────┘        │    │
         │                │            236        │    │
         │                ▼                       │    │
         │       ◇ Event Over? ◇──── NO ──────────┘    │
         │                │ YES      238               │
         │                ▼                            │
         └── NO ──◇ Temp within Tolerance? ◇── YES ────┘
```

PROACTIVE THERMAL MANAGEMENT SYSTEM

CROSS-REFERENCE TO RELATED APPLICATION

This application claims the benefit of Indian Provisional Patent Application No. 202111039315, filed on Aug. 31, 2021, the disclosure of which is incorporated herein by reference in its entirety.

BACKGROUND

Various components within an aircraft require thermal management to operate. For example, a propeller motor and a battery powering the propeller motor both generate heat during operation and can overheat (surpass an upper temperature limit) if left uncooled. Certain components, such as the battery, also may have a lower temperature limit to operate properly. Accordingly, the aircraft is equipped with a thermal management system including cooling circuits for these components.

The thermal cycling of these components does not remain constant during a flight. Rather, each component may have a normal operating temperature based on normal power consumption during the flight and peak operating temperatures resulting from specific events occurring during the flight. For example, the heat of a motor and/or inverter of a propeller arrangement of the aircraft may increase during take off, landing, hovering, or turning of the aircraft compared to the temperature during cruising. The heat of the battery also may cycle based on how much power is drawn by the propeller arrangements or other components during the flight. Accordingly, the thermal management system is typically configured to provide sufficient cooling for the expected elevated temperatures.

SUMMARY

Some aspects of the disclosure are directed to a thermal management system configured to provide proactive cooling to one or more components of a power system to mitigate the temperature cycle of the component during a high power event (e.g., take off, landing, hovering, turning, etc.).

By proactively cooling the components, the peak operating temperature of the component may be reduced. Accordingly, the maximum output of the thermal management system 120 required to combat these peak operating temperatures also may be mitigated, which allows for smaller/lighter components of the thermal management system 120. For example, the flow rate of the coolant needing to pass over a component during a high power event may be reduced, which allows for the use of a smaller pump arrangement. The amount of heat needing to be removed from the coolant during a high power event also may be reduced, which allows for the use of a smaller radiator, a smaller chiller, a smaller condenser, and/or a reduced amount of coolant carried by the aircraft.

In certain implementations, the thermal management system provides cooling to a component before the temperature of the component has begun to rise based on an expectation of a temperature rise. In some implementations, the expectation that the temperature will rise is based on a maneuver command (e.g., take-off, land, hover, turn) sent to the flight management system by the pilot. In other implementations, the expectation that the temperature will rise is based on a maneuver command included in a flight plan for the aircraft.

In some examples, the thermal management system increases cooling of a component expected to be affected by the high power event even before the command from the flight plan is implemented. In other examples, the thermal management system increases cooling of a component expected to be affected by the high power even after the command is implemented, but before the temperature of the component has exceeded an upper boundary threshold.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 6 is a flowchart illustrating a second thermal management system control process.

DETAILED DESCRIPTION

Figure 1:
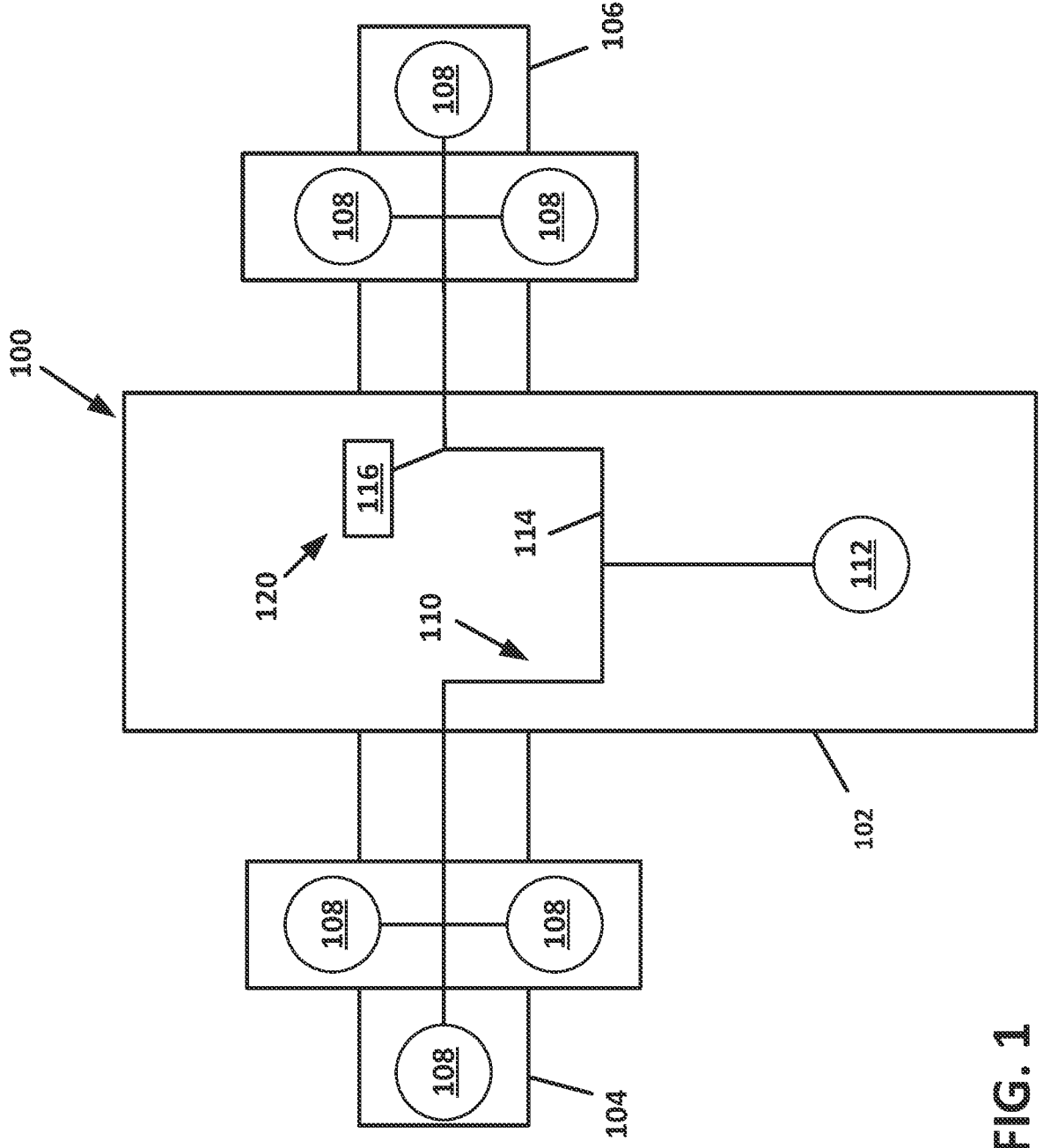
FIG. 1 is a schematic diagram of an example aircraft power system.

Reference will now be made in detail to exemplary aspects of the present disclosure that are illustrated in the accompanying drawings. Wherever possible, the same reference numbers will be used throughout the drawings to refer to the same or like parts.

An aircraft 100 includes a fuselage 102 defining a cabin sized to carry a pilot and one or more passengers. The aircraft 100 also includes a first wing 104 and a second wing 106 that each carry one or more propeller arrangements 108 or other propulsion components. In the example shown, three propeller arrangements 108 are disposed at each wing 104, 106. In other examples, however, each wing 104, 106 may carry any desired number or propulsion components. In certain examples, each propeller arrangement 108 includes a motor and an inverter to operate the propeller arrangement 108.

The aircraft 100 includes a power system 110 including at least one battery 112 that powers the propeller arrangements 108 via a power bus 114. In the example shown, the propeller arrangements 108 are powered by a main battery 112 carried by the fuselage 102. In other examples, the propeller arrangements 108 may be powered by one or more batteries 112 carried by the wings 104, 106. In certain implementations, the power system 110 also provides electric power to other components of the aircraft such as the flight management system, the control display unit, and/or lighting. In certain implementations, the power system 110 also provides electric power to one or more components 116 of a thermal management system 120 used to cool the battery 112 and/or other components such as the propeller arrangement 108.

Figure 2:
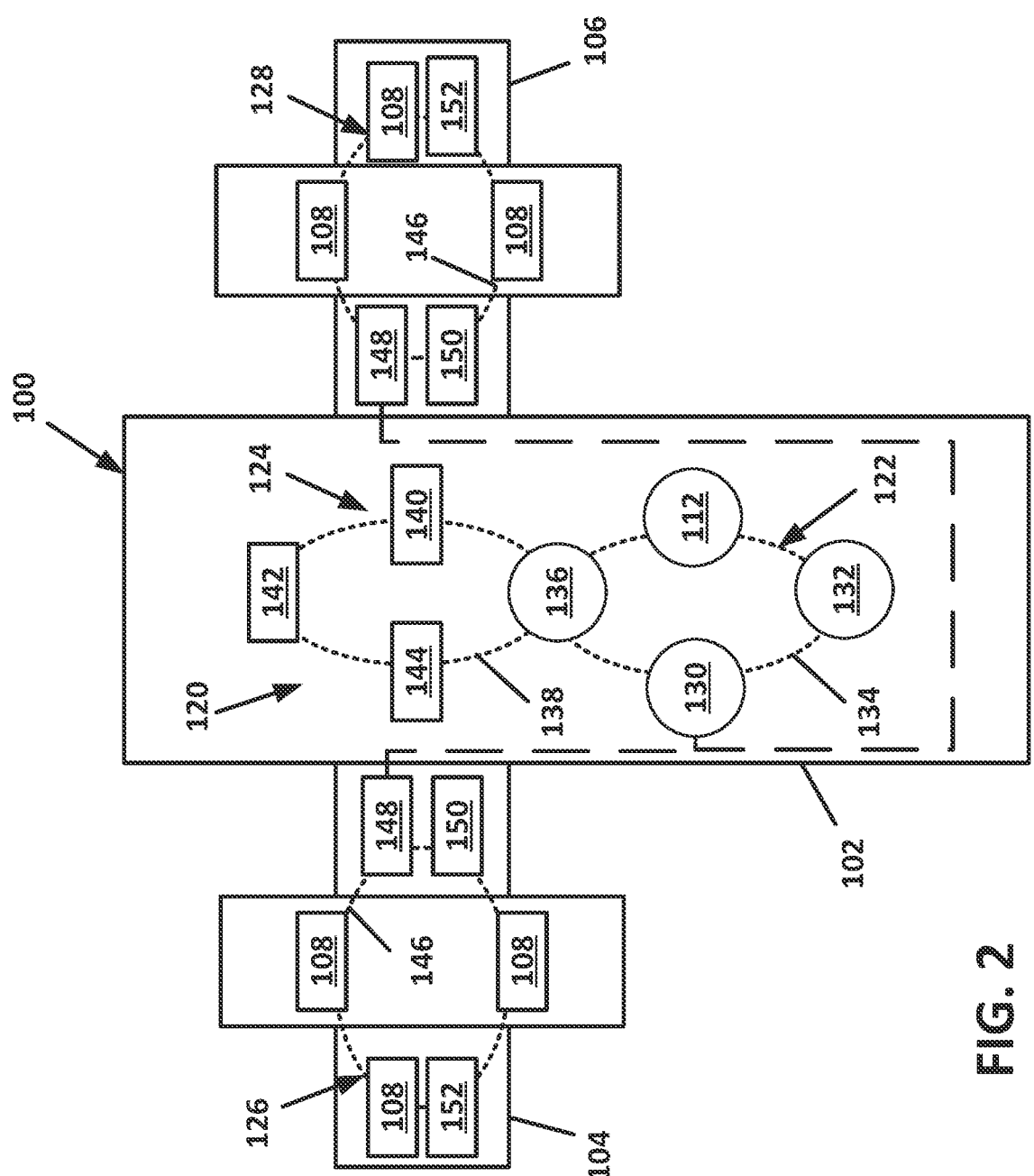
FIG. 2 is a schematic diagram of a thermal management system for use in cooling the power system, the thermal management system including one or more cooling circuits for the propellers in each wing, a battery cooling circuit, and a refrigeration circuit.

FIG. 2 illustrates an example thermal management system 120 including one or more cooling circuits 122, 124, 126, 128 that cool various components of the aircraft. In the illustrated example, the thermal management system 120 includes a battery cooling circuit 122 configured to cool one or more batteries 112 of the power system 110, a refrigeration circuit 124 configured to cool one or more of the cooling circuits 122, 126, 128, a first motor/inverter cooling circuit 126 configured to cool one or more of the propeller arrangements 108 at the first wing 104, and a second motor/inverter cooling circuit 128 configured to cool one or more of the propeller arrangements 108 at the second wing 106. In other examples, each propeller arrangement 108 may have a corresponding motor/inverter cooling circuit 126. In other examples, each propeller arrangement 108 may have a respective battery 112 and battery cooling circuit 122.

The battery cooling circuit 122 includes a tank 130 configured to hold coolant (e.g., water), a pump 132 configured to draw the coolant from the tank 130, and a conduit 134 along which the coolant flows through the battery cooling circuit 122. The conduit 134 is directed from the pump 132 towards the battery 112. After absorbing heat from the battery 112, the coolant is directed to a chiller 136 at which heat from the coolant is absorbed by refrigerant passing through the refrigeration circuit 124. The cooled coolant then passes back to the tank 130.

The refrigeration circuit 124 includes a conduit 138 through which the refrigerant (e.g., glycol) is carried through the refrigeration circuit 124. The refrigeration circuit 124 also includes a compressor 140 configured to draw the refrigerant along the conduit 138 and to pressurize (e.g., vaporize) the refrigerant; a condenser 142 at which at least some heat is removed from the pressurized refrigerant; and an expansion valve 144 creates a pressure drop so that low temperature, low pressure refrigerant is then conveyed to the chiller 136 at which the refrigerant absorbs heat from the coolant of the battery cooling circuit 122.

Each of the motor/inverters cooling circuits 126, 128 includes a conduit 146 through which coolant flows through the circuit. Each of the motor/inverter cooling circuits 126, 128 also includes a tank 148, a pump arrangement 150 of one or more pumps to draw coolant from the tank 148 and circulate the coolant through the conduit 146, and a radiator 152 exposed to ambient air outside the aircraft. The coolant passes from the pump arrangement 150 to a motor and/or an inverter of one or more of the propeller arrangements 108 at which heat is absorbed by the coolant. The heated coolant is air cooled at the radiator 152 before returning to the tank 148.

In some implementations, each of the coolant circuits 122, 126, 128 operates independently. In other implementations, one or more of the coolant circuits 122, 126, 128 may be fluidly coupled. For example, the tanks 148, 130 of each coolant circuit 122, 126, 128 may be fluidly coupled together. In certain examples, two of more of the coolant circuits 122, 126, 128 may be selectively fluidly coupled together using directional control valves operated by an electronic controller. For example, two or more of the coolant circuits 122, 126, 128 may be fluidly coupled during a failure of one or more components of one of the coolant circuits or during a period where one or more components of the power system 110 require extra cooling.

Figure 3:
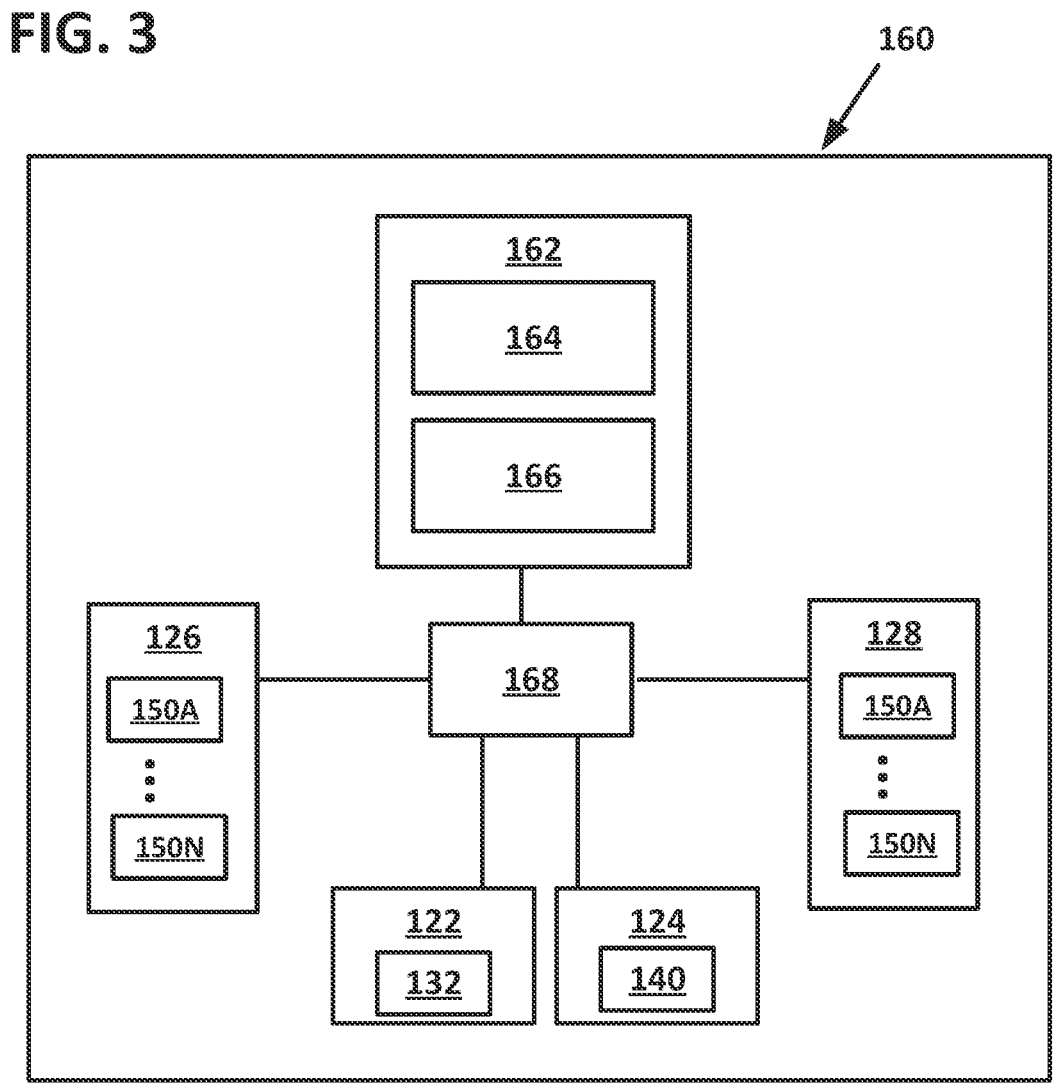
FIG. 3 illustrates an electronic controller schema for the thermal management system.

FIG. 3 illustrates a system control schema 160 by which the components of the power system 110 and the thermal management system 120 are operated. The control schema 160 includes one or more electronic controllers that each include a memory and processor configured to store and implement instructions for operating the components. In certain examples, the control schema 160 includes a system controller 162 implementing a flight management system. The system controller 162 includes a user interface 164 (e.g., a graphic user interface) at which commands can be input by a pilot of the aircraft 100. The system controller 162 also may include an interface 166 by which the system controller 162 communicates with a TMS controller 168 of the thermal management system 120. In other examples, the system controller 162 may operate the thermal management system 120 directly.

The TMS controller 168 is configured to operate components of the thermal management system 120. For example, the TMS controller 168 controls the operation of the pump 132 (e.g., controls the speed and/or volume of the coolant through the pump) of the battery cooling circuit 122, the compressor 140 (e.g., controls the speed and/or volume of the refrigerant through the compressor) of the refrigerant circuit 124, and the pump arrangements 150 (e.g., controls the speed and/or volume of the coolant through the pump arrangement) of the motor/inverter circuits 126, 128. In certain examples, the TMS controller 168 controls separate pumps 150A-150N for each propeller arrangement 108.

Figure 4:
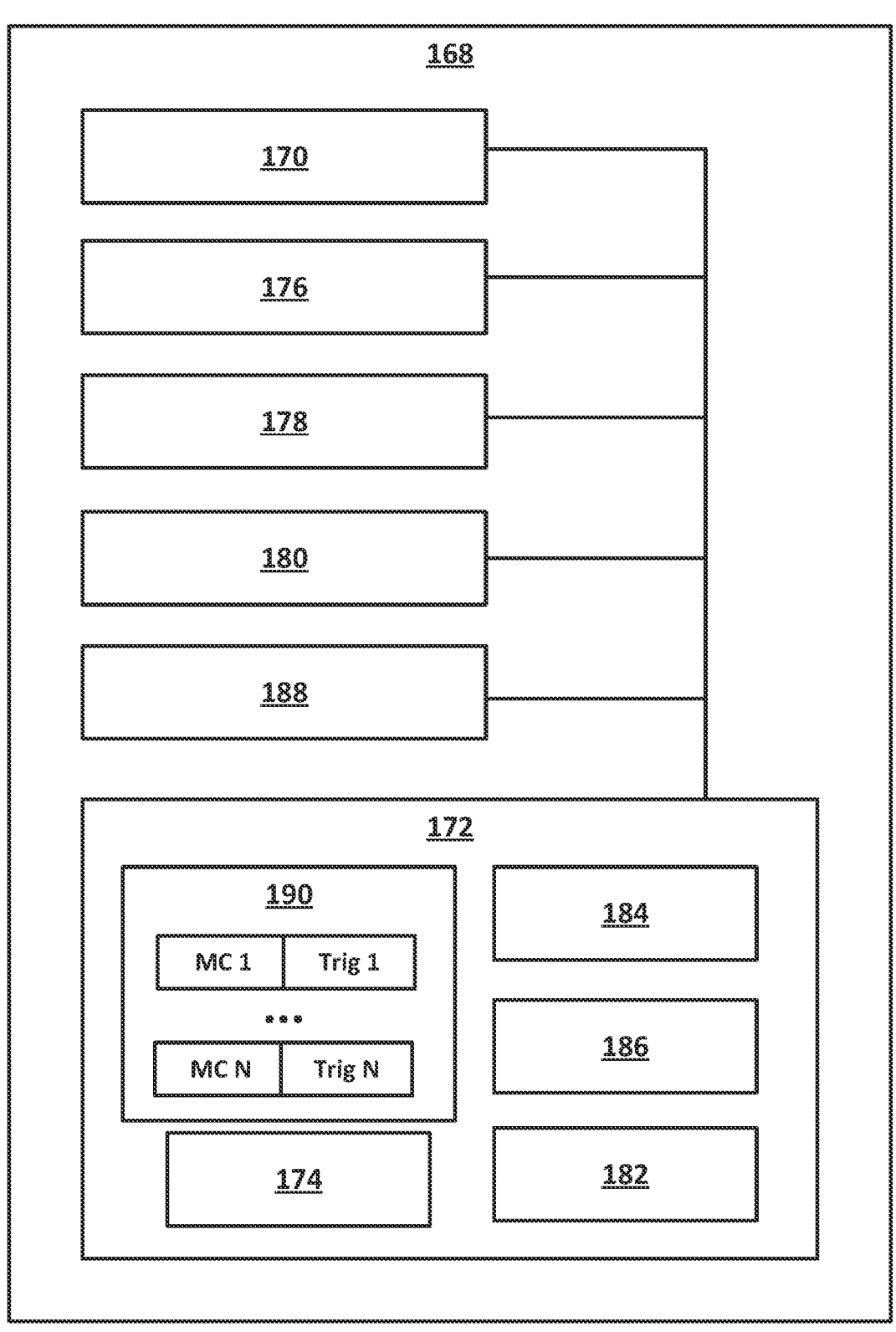
FIG. 4 is a schematic diagram of a thermal management system controller suitable for use with the thermal management system of FIG. 2 in the electronic controller schema of FIG. 3.

FIG. 4 illustrates an example TMS controller 168 suitable for use in operating the thermal management system 110. The TMS controller 168 includes one or more electronic memories 172 configured to store instructions 174 for operating the various components of the thermal management system 110. The TMS controller 168 also includes one or more processors 170 configured to implement the instructions stored in the memory 172. The TMS controller 168 includes interfaces to communicate with the various components, such as a compressor interface 176 by which the processor 170 controls the compressor 140 of the refrigeration circuit 124 and one or more pump interfaces 178 by which the processor 170 controls the pumps 150 of the motor/inverter cooling circuits 126, 128 and/or the pump 132 of the battery cooling circuit 122.

The TMS controller 168 also includes a temperature sensor arrangement 180 (or an interface for a temperature sensor arrangement) including one or more temperature sensors disposed at components of the power system 110. For example, a temperature sensor may be disposed at the battery 112, at one or more of the motors and/or one or more of the inverters of the propeller arrangements 108, at the chiller 136, or at any other desired component. In other implementations, the temperature sensor arrangement 180 may determine a temperature of a component based on other sensed data (e.g., pressure, movement, etc.). Temperature data 182 obtained by the temperature sensor arrangement 180 is communicated to the processor 170 and/or is stored in the memory 172.

Various temperature thresholds also may be stored in the memory 172 of the TMS controller 168. For example, a first threshold 184 may indicate an upper temperature limit for the battery 112 and a second threshold 186 may indicate a lower temperature limit for the battery 112. In other examples, the first and second thresholds 184, 186 may indicate temperatures at which action must be taken to cool or warm the battery 112 before an upper or lower temperature threshold of the battery 112 is reached. Other thresholds that can be stored include a maximum temperature limit for the motor of a propeller arrangement 108, a maximum temperature limit for the inverter of a propeller arrangement 108, a maximum temperature limit for the chiller 136, and other such boundaries.

In certain implementations, the TMS controller 168 includes a system interface 188 by which the TMS controller 168 communicates with the system controller 162. In certain implementations, the TMS controller 168 monitors commands input by the pilot using the system interface 188. In certain implementations, the TMS controller 168 monitors commands obtained from a flight plan 190 entered into the system controller 162 before or during a flight. The flight plan 190 includes various commands $MC_1$-$MC_N$ (e.g., take-off commands, landing commands, hovering commands, turning commands, etc.) for controlling the propeller arrangements 108. In certain examples, the flight plan 190 also includes trigger events $Trig_1$-$Trig_N$ (e.g., positioning along the flight path such as GPS coordinates, timing, etc.) at which a corresponding one or more of the commands $MC_1$-$MC_N$ is executed. In certain examples, the flight plan 190 can be stored in the memory 172 of the TMS controller 168.

Figure 5:
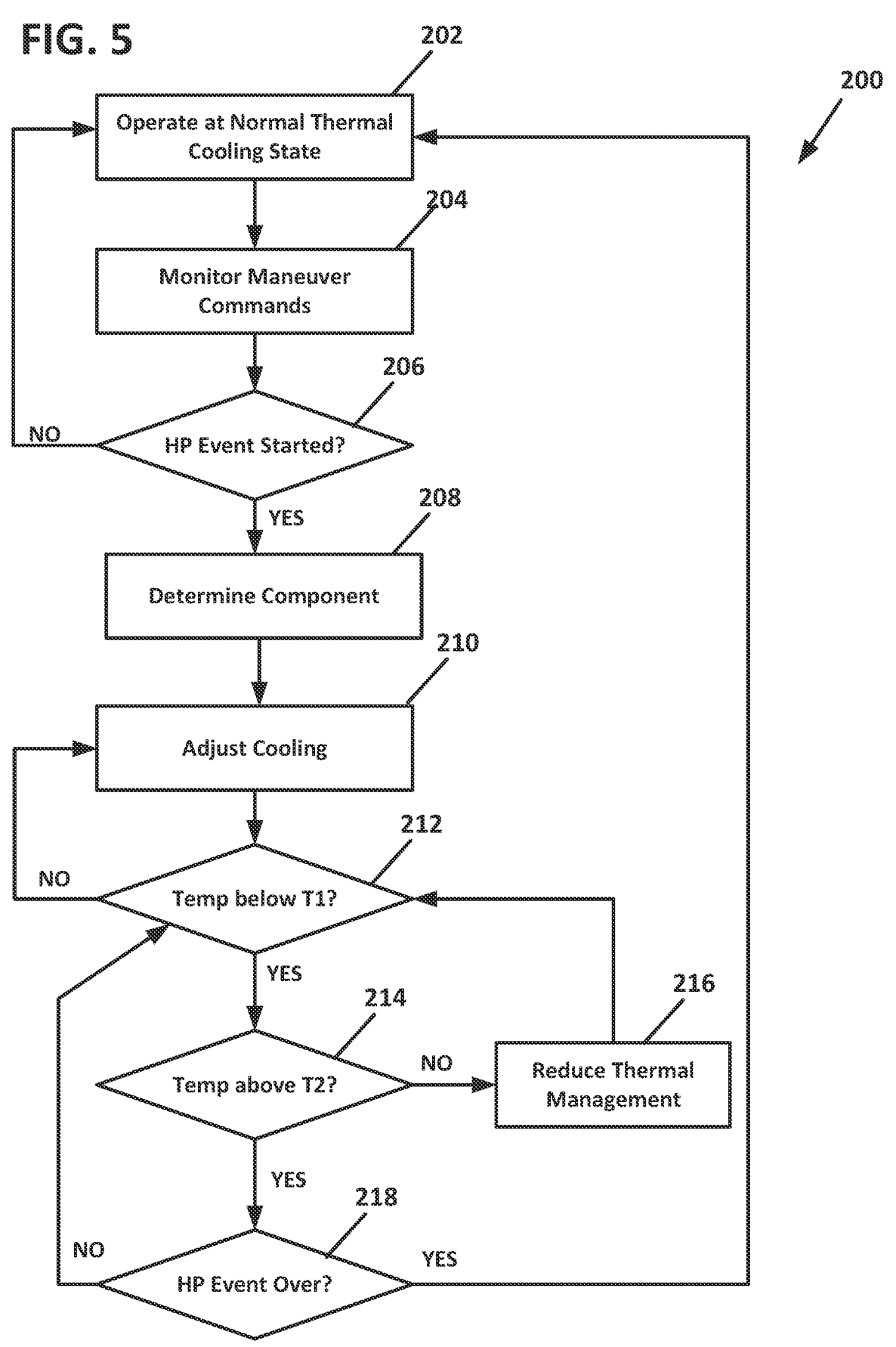
FIG. 5 is a flowchart illustrating a first thermal management system control process.

FIGS. 5 and 6 illustrate processes by which the TMS controller 168 can operate the thermal management system 120. FIG. 5 shows a first process 200 by which the TMS controller 168 operates the thermal management system 120 based on monitored commands received by the pilot and the temperature data 182. FIG. 6 shows a second process 220 by which the TMS controller 168 operates the thermal management system 120 based on the flight plan 190 and/or the temperature data 182. In certain implementations, the TMS controller 168 implements both processes 200, 220. For example, the TMS controller 168 may implement the second process 220 to anticipate thermal cycling based on known upcoming commands based on the flight plan 190 while also using the first process 200 to react quickly to unexpected commands input by the pilot.

As shown in FIG. 5, the first process 200 begins at a first operation 202 by operating the thermal management system 120 at a normal level of operation for each component. For example, the pump 132, 150 of each coolant circuit 122, 126, 128 circulates a predetermined volume of coolant at a predetermined rate selected to cool the corresponding power system components based on a standard operating temperature of the components.

The TMS controller 168 monitors commands (e.g., maneuver commands) input by the pilot at a second operation 204. The TMS controller 168 determines whether the commands indicate a high power event (e.g., take-off, landing, hovering, turning) is starting. If the TMS controller 168 determines at module 206 that the command does not indicate that a high power event is starting, then the TMS controller 168 continues to monitor commands at the second operation 204. However, if the TMS controller 168 determines at the module 206 that a high power event is starting, then the TMS controller 168 determines which components of the power system 110 will be affected by the high power event (e.g., are likely to heat up) at a third operation 208.

At a fourth operation 210, the TMS controller 168 increases cooling at the determined components. For example, if the TMS controller 168 determines that a turn event is starting, then the TMS controller 168 may increase a flow rate of a pump 150 of the cooling circuit 126, 128 of one of the wings 104, 106 to provide enhanced cooling at the motor and/or inverter of the relevant propeller arrangements 108. In certain examples, the TMS controller 168 may determine at the third operation 208 that the battery 112 is likely to experience an enhanced power draw during the high power event and may provide enhanced cooling (may increase the flow rate of pump 132) to the battery 112 at the fourth operation 210.

In certain implementations, the TMS controller 168 also may enhance cooling by increasing a flow rate of the compressor 140 to increase the amount of refrigerant being provided to the chiller 136 to cool the coolant of the battery cooling circuit 122. In certain implementations, the TMS controller 168 may fluidly couple together the coolant of one or more of the cooling circuits 122, 126, 128. Accordingly, the enhanced cooling provided to the battery cooling circuit 122 by the refrigeration circuit 124 may be distributed to the motor/inverter cooling circuits 126, 128. Similarly, the coolant of the battery cooling circuit 122 could be further cooled by passage by the radiators 152 of the motor/inverter cooling circuits 126, 128.

In certain examples, the TMS controller 168 may determine at the third operation 208 one or more components at which a temperature is expected to decrease during a high power event. For example, if the high power event is a turn, then the propeller arrangements 108 on one of the wings 104, 106 may draw more power than during normal operation and the propeller arrangements 108 on the other of the wings 104, 106 may draw less power than during normal operation. In such situations, at the fourth operation 210, the TMS controller 168 may temporarily reduce the amount of coolant supplied to the propeller arrangement 108 or other component expected to generate less heat. In certain examples, the TMS controller 168 may direct coolant that otherwise would have been supplied to the component expected to generate less heat to the component expected to generate more heat instead.

In certain implementations, the TMS controller 168 also monitors temperature data obtained by the temperature sensor arrangement 180 to further adjust cooling provided to the various components. For example, the TMS controller 168 may continue to increase a flow rate of the coolant and/or a flow rate of the refrigerant if the temperature of one or more of the identified components is determined at module 212 to increase beyond a first threshold T1 (e.g., first threshold 184). Likewise, the TMS controller 168 may decrease the flow rate of the coolant and/or the flow rate of the refrigerant at a fifth operation 216 if the temperature of one or more of the identified components is determined at module 214 to decrease beyond a second threshold T2 (e.g., second 186). When the TMS controller 168 determines at module 218 that the high power event is ending (e.g., receives a command to stop turning), then the TMS controller 168 returns the thermal management system to operating at a normal cooling state.

As shown in FIG. 6, the second process 220 begins at a first operation 222 at which the TMS controller 168 and/or the system controller 162 receive a flight plan 190 for the aircraft 100. In some examples, all or portions of the flight plan 190 is stored in the memory 172 of the TMS controller 168. In other examples, the flight plan 190 is stored in the memory of the system controller 162. At a second operation 224, the planned high powered events included in the flight plan 190 are identified. For example, the high powered events may include take-off, hovering, turning, and landing. Triggers for the high powered events also are identified. In some examples, the triggers may include a maneuver command entered by the pilot. In other examples, the triggers may include a geographic location of the aircraft (i.e., position along a planned flight path), a time, etc.).

At a third operation 226, the TMS controller 168 operates the thermal management system 120 at a normal level of operation for each component. For example, the pump 132, 150 of each coolant circuit 122, 126, 128 circulates a predetermined volume of coolant at a predetermined rate selected to cool the corresponding power system components based on a standard operating temperature of the components. The TMS controller 168 monitors a status of the flight plan 190 at a fourth operation 228. For example, the TMS controller 168 determines at module 230 when an identified high power event is imminent (e.g., based on the previously executed commands and/or based on the position of the aircraft along the planned flight path).

When the TMS controller 168 determines a high power event is imminent, the TMS controller 168 identifies one or more components that would be affected by the high power event and determines a likely temperature rise or drop for each component at a fifth operation 232. For example, the flight plan 190 may indicate that a propeller arrangement 108 is intended to operate at a predetermined power level for a predetermined period of time. The amount of heat generated by the propeller arrangement 108 operating at the predetermined power level for the predetermined period of time can be calculated based on known thermal principles. The TMS controller 168 also may calculate how much power may be required from the battery 112 to operate the propeller arrangement 108 at the predetermined power level for a predetermined period of time and, therefore, calculate a resulting temperature increase for the battery 112.

At a sixth operation 234, the TMS controller 168 adjusts the level of cooling provided to each component based on the calculations of the fifth operation 232. For example, the TMS controller 168 may increase a coolant rate of an identified motor/inverter cooling circuit 126, 128 by a calculated amount. In certain implementations, the TMS controller 168 increases the coolant rate before a temperature of the identified motor/inverter has begun to increase. In certain implementations, the TMS controller 168 may increase the coolant rate before the maneuver command of the high power event is implemented by the aircraft 100 (e.g., before the propeller arrangement 108 begins executing the maneuver). In certain implementations, the TMS controller 168 may increase the coolant rate a predetermined period of time (e.g., one or more seconds, one or more minutes, etc.) before the maneuver command of the flight plan 190 is intended to be executed (e.g., before the aircraft 100 reaches the relevant geographical location at which the maneuver command is to be executed). In certain implementations, the TMS controller 168 may decrease a coolant rate of the motor/inverter cooling circuit 126, 128 of a propeller arrangement 108 expected to cool down (or to not heat up) during the high power event. The TMS controller 168 also may increase a compressor speed to increase a flow rate of the refrigerant through the refrigeration circuit 124 if needed based on the calculations.

At module 236, the TMS controller 168 determines at module 236 whether the high power event is ending. For example, the TMS controller 168 may determine that the aircraft 100 has reached a particular geographic location (e.g., has finished turning to stay on the flight path) or that a subsequent maneuver command is being executed. The TMS controller 168 may continue adjusting the cooling of the various components until the high power event is over. Once over, the TMS controller 168 may return to normal operation. Alternatively, the TMs controller 168 may proceed to a module 238 at which the TMS controller 168 determines whether the temperature of the various components obtained by the temperature sensor arrangement 180 has returned to normal (e.g., are within predetermined tolerances). In such examples, the TMS controller 168 returns to normal operation only if the relevant components have cooled down enough for normal thermal cooling to be sufficient. Otherwise, the TMs controller 168 continues to adjust the thermal cooling of the relevant components until temperatures are within tolerances.

In certain implementations, the TMS controller 168 may begin cooling of one or more components (e.g., increase relevant coolant pump flow rate) based on an expected flight plan maneuver that has not yet been implemented, but not fully increase the cooling to calculated levels until the command has been implemented. In an example, the TMS controller 168 may increase pump flow by a first amount prior to execution of the maneuver and increase by a second amount during or after execution of the maneuver. In another example, the TMS controller 168 may increase a coolant pump flow prior to execution of the maneuver and increase a refrigerant flow during or after execution of the maneuver. In another example, the TMS controller 168 may increase a refrigerant flow prior to execution of the maneuver and increase a coolant pump flow during or after execution of the maneuver. Accordingly, the thermal management system 120 still takes proactive action to mitigate the temperature spike for the relevant components while also mitigating unnecessary stress on the components of the thermal management system.

Aspects of the Invention

1. A method of operating a thermal management system of an aircraft, the method comprising:
    operating a thermal management system in a normal operating mode;
    identifying an imminent temperature rise of a component of the aircraft; and
    increasing coolant flow to the component before a temperature of the component rises.

2. The method of aspect 1, wherein identifying an imminent temperature rise of the component comprises:
    monitoring maneuver commands provided to a system controller from a user interface, each maneuver command being associated with a power output level of one or more components of the aircraft;
    identifying the power output level of each maneuver command, wherein the imminent temperature rise is identified when the power output level is high; and
    identifying the one or more components associated with each maneuver command identified as being associated with a high power output level, wherein the component for which the imminent temperature rise is identified is one of the one or more identified components.

3. The method of aspect 1, wherein identifying an imminent temperature rise of the component comprises:
    receiving a flight plan including a plurality of maneuver commands;
    monitoring progress of a flight of the aircraft relative to the flight plan to determine upcoming maneuver commands;
    identifying the power output level of each upcoming maneuver command, wherein the imminent temperature rise is identified when the power output level is identified as high; and

identifying the one or more components associated with each upcoming maneuver command identified as being associated with a high power output level, wherein the component for which the imminent temperature rise is identified is one of the one or more identified components.

4. The method of aspect 2 or aspect 3, wherein the coolant flow to the component is increased before the maneuver command is implemented by the system controller.

5. The method of aspect 3, wherein the coolant flow to the component is increased a predetermined period of time before the maneuver command is provided to the system controller.

6. The method of any of aspects 1-3, wherein increasing coolant flow to the component comprises identifying a pump associated with a cooling system for the component and increasing a flow rate of the identified pump.

7. The method of aspect 6, wherein increasing a flow rate of the identified pump comprises running the identified pump at a maximum speed.

8. The method of any of aspects 1-7, wherein the component is a battery.

9. The method of any of aspects 1-7, wherein the component is a motor arrangement.

10. The method of any of aspects 1-9, wherein the coolant flow is cooled using a refrigerant cycle, and wherein the method comprises increasing power supplied to a compressor of the refrigerant cycle after identifying an imminent temperature rise of a component of the aircraft.

11. The method of any of aspects 1-10, further comprising:
monitoring a temperature of the component; and
adjusting the coolant flow to the component based on the temperature of the component regardless of whether an imminent temperature rise has been identified.

12. The method of any of aspects 1-11, further comprising:
determining a temperature of the component has dropped below a first threshold;
determining that another temperature rise of the component is not imminent; and
reducing the coolant flow to the component to a normal level.

13. The method of aspect 11, wherein adjusting the coolant flow to the component includes reducing the coolant flow if the temperature of the component drops below a second threshold.

14. The method of aspect 11, wherein adjusting the coolant flow to the component includes increasing the coolant flow if the temperature of the component rises above a third threshold.

15. The method of any of aspects 1-14, wherein the component is a first component; and wherein the method further comprises:
identifying an imminent lower power consumption level of a second component; and
reducing coolant flow to the second component.

16. The method of aspect 15, wherein reducing the coolant flow includes diverting at least a portion of the coolant flow to the first component.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method of operating a thermal management system of an aircraft, the thermal management system comprising a first cooling circuit for cooling a battery of the aircraft and a second cooling circuit for cooling a motor arrangement of the aircraft, the second cooling circuit operating independently of the first cooling circuit; the method comprising:
sharing a refrigeration circuit between the first and second cooling circuits, wherein the refrigeration circuit includes a compressor, a condenser, and an expansion valve;
operating the thermal management system in a normal operating mode;
identifying an imminent temperature rise of each of the battery and the motor arrangement; and
in response to the identification, increasing a flow rate of a pump of the first cooling circuit and increasing a flow rate of a pump of the second cooling circuit, and increasing a flow rate of the compressor of the refrigeration circuit to chill the first and second cooling circuits before a temperature of the battery and the motor arrangement rises.

2. The method of claim 1, wherein identifying an imminent temperature rise of the battery or the motor arrangement comprises:
monitoring maneuver commands provided to a system controller from a user interface, each maneuver command being associated with a power output level of the battery or the motor arrangement of the aircraft; and
identifying the power output level of each maneuver command, wherein the imminent temperature rise is identified when the power output level is high.

3. The method of claim 2, wherein coolant flow to the battery or the motor arrangement is increased before the maneuver command is implemented by the system controller.

4. The method of claim 1, wherein identifying an imminent temperature rise of the battery or the motor arrangement comprises:
receiving a flight plan including a plurality of maneuver commands;
monitoring progress of a flight of the aircraft relative to the flight plan to determine upcoming maneuver commands; and
identifying a power output level of each upcoming maneuver command, wherein the imminent temperature rise is identified when the power output level is identified as high.

5. The method of claim 4, wherein coolant flow to the battery or the motor arrangement is increased a predetermined period of time before the maneuver command is provided to a system controller.

6. The method of claim 1, wherein increasing a flow rate of a pump of the first cooling circuit and a flow rate of a pump of the second cooling circuit comprises running the pumps at a maximum speed.

7. The method of claim 1, wherein the method comprises increasing power supplied to the compressor after identifying an imminent temperature rise of the battery or the motor arrangement.

8. The method of claim 1, further comprising:
monitoring a temperature of the battery or the motor arrangement; and
adjusting coolant flow to each of the battery and the motor arrangement based on the temperature of the battery or the motor arrangement regardless of whether an imminent temperature rise has been identified.

9. The method of claim 8, wherein adjusting coolant flow to each of the battery and the motor arrangement includes reducing the coolant flow when the temperature of the battery or the motor arrangement drops below a second threshold.

10. The method of claim 8, wherein adjusting coolant flow to each of the battery and the motor arrangement includes increasing the coolant flow when the temperature of the battery or the motor arrangement rises above a third threshold.

11. The method of claim 1, further comprising:

determining a temperature of the battery or the motor arrangement has dropped below a first threshold;

determining that another temperature rise of the battery or the motor arrangement is not imminent; and reducing coolant flow to each of the battery and the motor arrangement to a normal level.

12. An electronic controller of an aircraft that each include a memory and processor configured to store and implement instructions for operating a thermal management system of the aircraft, the thermal management system comprising a first cooling circuit for cooling a battery of the aircraft and a second cooling circuit for cooling a motor arrangement of the aircraft, the second cooling circuit operating independently of the first cooling circuit, the instructions comprising:

sharing a refrigeration circuit between the first and second cooling circuits, wherein the refrigeration circuit includes a compressor, a condenser, and an expansion valve;

operating the thermal management system in a normal operating mode;

identifying an imminent temperature rise of each of the battery and the motor arrangement; and in response to the identification, increasing a flow rate of a pump of the first cooling circuit and increasing a flow rate of a pump of the second cooling circuit, and increasing a flow rate of the compressor of the refrigeration circuit to chill the first and second cooling circuits before a temperature of the battery and the motor arrangement rises.

13. The electronic controller of claim 12, wherein identifying an imminent temperature rise of the battery or the motor arrangement comprises:

monitoring maneuver commands provided to a system controller from a user interface, each maneuver command being associated with a power output level of the battery or the motor arrangement of the aircraft; and identifying the power output level of each maneuver command, wherein the imminent temperature rise is identified when the power output level is high.

14. The electronic controller of claim 12, wherein identifying an imminent temperature rise of the battery or the motor arrangement comprises:

receiving a flight plan including a plurality of maneuver commands;

monitoring progress of a flight of the aircraft relative to the flight plan to determine upcoming maneuver commands; and identifying a power output level of each upcoming maneuver command, wherein the imminent temperature rise is identified when the power output level is identified as high.

15. The electronic controller of claim 12, wherein the instructions further comprise:

monitoring a temperature of the battery or the motor arrangement; and adjusting coolant flow to each of the battery and the motor arrangement based on the temperature of the battery or the motor arrangement regardless of whether an imminent temperature rise has been identified.

* * * * *